(12) United States Patent
Ghirardi et al.

(10) Patent No.: US 11,639,081 B2
(45) Date of Patent: May 2, 2023

(54) DEVICE AND APPARATUS FOR THE HEIGHT ADJUSTMENT OF A ROAD VEHICLE AND RELATIVE ROAD VEHICLE

(71) Applicant: FERRARI S.p.A., Modena (IT)

(72) Inventors: Federico Ghirardi, Modena (IT); Thierry Annequin-Digond, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 17/386,893

(22) Filed: Jul. 28, 2021

(65) Prior Publication Data

US 2022/0032713 A1 Feb. 3, 2022

(51) Int. Cl.
*B60G 17/033* (2006.01)
*B60G 15/06* (2006.01)

(52) U.S. Cl.
CPC ......... *B60G 17/033* (2013.01); *B60G 15/062* (2013.01); *B60G 2202/12* (2013.01); *B60G 2202/24* (2013.01); *B60G 2800/914* (2013.01)

(58) Field of Classification Search
CPC  B60G 17/033; B60G 15/062; B60G 2202/12; B60G 2202/24; B60G 2800/914; B60G 15/063
See application file for complete search history.

(56) References Cited

U.S. PATENT DOCUMENTS

| | | | |
|---|---|---|---|
| 8,770,592 B2 * | 7/2014 | Cox | B60G 17/0272 280/124.179 |
| 9,068,616 B1 * | 6/2015 | Serbu | B60G 17/0272 |
| 9,162,548 B1 * | 10/2015 | Wakeman | F16F 1/121 |
| 2009/0283977 A1 | 11/2009 | Michel | |
| 2016/0159191 A1 * | 6/2016 | Seminara | B60G 15/063 267/218 |
| 2016/0229253 A1 * | 8/2016 | Seminara | B60G 17/0272 |
| 2017/0057315 A1 | 3/2017 | Rutherford | |

(Continued)

FOREIGN PATENT DOCUMENTS

| | | |
|---|---|---|
| DE | 102008050682 A1 | 4/2010 |
| DE | 102016105958 A1 | 10/2017 |

(Continued)

OTHER PUBLICATIONS

Machine Translation of DE102016105958 (Year: 2017).*

(Continued)

*Primary Examiner* — Paul N Dickson
*Assistant Examiner* — Kurtis Nielson
(74) *Attorney, Agent, or Firm* — Cantor Colburn LLP (57) ABSTRACT

A device for the height adjustment of a road vehicle interposed between a frame and a suspension of the road vehicle so as to allow the vehicle to shift from a road configuration to a race configuration and vice versa. The device comprises a base body provided with a first end, which can mechanically be connected to the frame of the road vehicle; a first mass, which can be connected to the base body so as to be movable along a sliding axis; a second mass, which is connected to the first mass so as to be movable along the sliding axis as well and is configured to be able to be connected to a suspension of the road vehicle and to change the stroke of the suspension depending on the position of the second movable mass.

14 Claims, 5 Drawing Sheets

(56) References Cited

U.S. PATENT DOCUMENTS

2018/0257450 A1* 9/2018 Stolle ................... B60G 15/062
2021/0237530 A1* 8/2021 Rajan ....................... B60G 7/04

FOREIGN PATENT DOCUMENTS

| DE | 102018210447 B3 | | 6/2019 | |
|----|----|----|----|----|
| JP | 2000296709 A | | 10/2000 | |
| JP | 2007127200 A | * | 5/2007 | |
| WO | WO-2011080163 A1 | * | 7/2011 | ........... B60G 15/063 |
| WO | 2017120509 A1 | | 7/2017 | |

OTHER PUBLICATIONS

Search Report for Italian Application No. 102020000018454 completed Apr. 9, 2021, 10 pages.
Extended European Search Report for Application No. 21188551.2 dated Nov. 5, 2021, 10 pages.

* cited by examiner

DEVICE AND APPARATUS FOR THE HEIGHT ADJUSTMENT OF A ROAD VEHICLE AND RELATIVE ROAD VEHICLE

CROSS-REFERENCE TO RELATED APPLICATIONS

This patent application claims priority from Italian patent application no. 102020000018454 filed on Jul. 29, 2020, the entire disclosure of which is incorporated herein by reference.

TECHNICAL FIELD

The invention relates to a device for the attitude adjustment of a road vehicle and to the relative road vehicle.

PRIOR ART

A new-generation road vehicle is substantially always provided with a plurality of suspensions, which connect the frame of the vehicle to the wheels. In high-performance vehicles, these suspensions often need to comprise systems for the adjustment of the attitude of the road vehicle. In particular, the term attitude generally identifies, among other things, the set of adjustments that determine a change in the rest position of the sprung masses of a vehicle.

Among the possible adjustments there definitely is the height of the lower part of the vehicle from the road surface (namely, of the frame relative to each wheel), which can change depending on the adjustment of the rest compression of the suspensions.

A high-performance vehicle usually needs to fulfil two different types of task, namely to allow for a road use and for a race use. In other words, a high-performance vehicle often needs to shift from a so-called "race" configuration to a so-called "road" configuration and vice versa. In detail, in the race configuration, the frame of high-performance vehicles is closer to the ground compared to the road configuration (in which it is farther).

In particular, on roads open to traffic, the road vehicle needs to have a higher frame, so that it can handle the wave-like surface of the roads as well as the imperfections, the bumps, the dips or the holes characterizing them, thus avoiding damages to the bottom of the vehicle.

On the contrary, on a race track, the road vehicle needs to have a lower frame, so as to lower its centre of gravity and have a better dynamic behaviour, thus improving the grip on the asphalt.

Furthermore, in both configurations, the stroke of the suspension (generally stopped by a limit stop buffer), which determines the oscillation of the sprung masses relative to the wheels and to the ground, needs to be adjusted as well (without changing it too much) in order to preserve a minimum height from the ground and avoid damaging the bottom of the vehicle in case of a curb or of an asphalt irregularity.

Generally speaking, different techniques are possible to change the height of a high-performance road vehicle, said techniques being substantially aimed at loading/unloading the main spring of each suspension (usually comprising at least one of shock absorber provided with the typical stem and a main spring usually externally concentric to said stem). One of the most frequent methods, which ensures high reliability and resistance also to the stresses that a vehicle (and each suspension) can undergo on a race track, entails mounting, at the top of the stem of each spring-shock absorber assembly, a so-called "top mount" threaded plate.

Said plate is substantially screwed at the top of the main stem of the shock absorber and, by screwing or unscrewing the plate on a thread, the rest compression of the main spring of each suspension can be adjusted and, hence, the distance between the frame and the wheel hub can be adjusted (namely, by carrying out the operation for all suspensions, the height of the vehicle from the ground can be adjusted). However, this method needs to be carried out in a workshop before every race performance and needs to be reversed, always in a workshop, at the end of the performance, so as to allow the vehicle to circulate on roads open to traffic. Furthermore, when the plate is lifted, the stroke of the suspension (namely, of the spring-shock absorber assembly) is simultaneously increased due to the translation of the limit stop buffer, which is integral to the top mount plate. The contrary happens during the lowering of the plate.

When designing a suspension, the different components are usually adjusted and chosen so as to be optimized for a specific configuration (for example, the hardness of a spring, the rest compression thereof, the viscosity or the dissipation of a shock absorber, its stroke, etc.). In high-performance vehicles, the optimized configuration should be the race configuration, in which the vehicle and its attitude need to express themselves at their best. In particular, both in the road configuration and in the race configuration, the main spring of a suspension preserves its length (depending on the sprung mass of the vehicle and, hence, unchanged) as the height of the vehicle from the ground changes, but, between the two configurations, the stroke of the shock absorber changes in a non-optimized manner; in this way, by moving the limit stop buffer together with the "top mount" plate, the shock absorber has a chance to cover a longer stroke (with a smaller elastic stiffness) compared to the race configuration for which it is optimized.

Therefore, when shifting from the race configuration to the road configuration, prior art suspensions stop having an optimal behaviour, since they were not designed to find themselves (at rest) in that (extended) configuration. This not only determines a significant reduction in driving pleasure when shifting from the race configuration to the road configuration, but also at least partially jeopardizes the easiness of driving and the stability of the vehicle, thus increasing risks for the safety of the bottom of the vehicle, of the driver and of possible passengers.

DESCRIPTION OF THE INVENTION

The object of the invention is to provide a device for the height adjustment of a road vehicle, which is at least partially free from the drawbacks described above, is easy and simple to be used by all users and is economic to be manufactured.

According to the invention, there are provided a device for the height adjustment of a road vehicle, an apparatus and the relative road vehicle according to the appended claims.

The appended claims describe preferred embodiments of the invention and form an integral part of the description.

BRIEF DESCRIPTION OF THE DRAWINGS

The invention will now be described with reference to the accompanying drawings showing a non-limiting embodiment thereof; in particular.

PREFERRED EMBODIMENTS OF THE INVENTION

Figure 1:
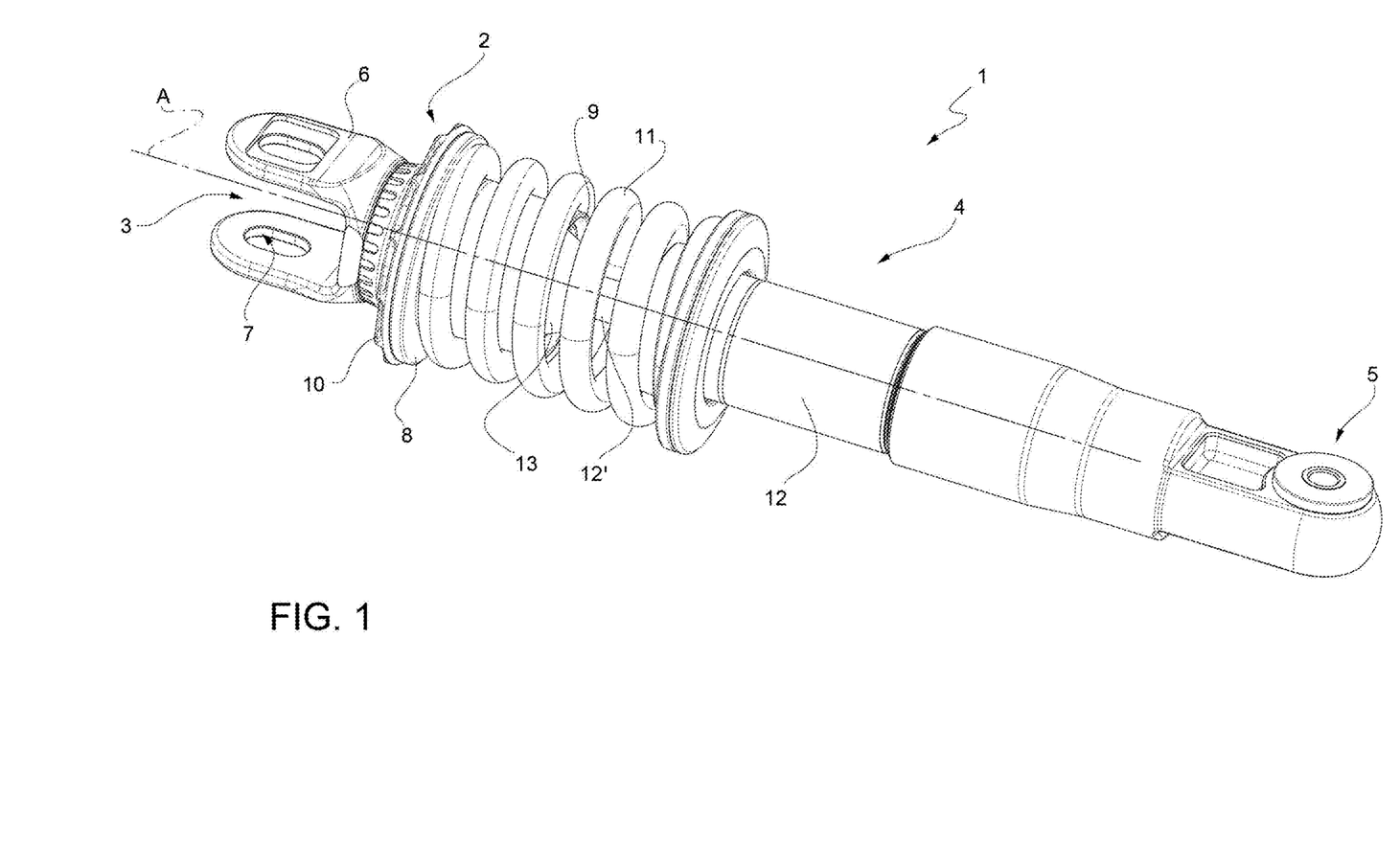
FIG. 1 is a schematic perspective view of a possible embodiment of an apparatus according to the invention.

In FIG. 1, number 1 indicates, as a whole, an apparatus for the height adjustment of a road vehicle (in particular, a high-performance car) provided with two front driven (namely, non-drive) wheels and with two rear drive wheels. In a front (or rear) position there is an engine (an internal combustion engine or a hybrid or electric motor), which produces a torque, which is transmitted to the drive wheels by means of a drivetrain.

The apparatus 1 comprises a device 2 for the height adjustment of the road vehicle, which is configured to connect the apparatus 1 to a frame through a mechanical coupling element 3.

The apparatus 1 further comprises a suspension 4, which is configured to be connected (in a direct or indirect manner, namely through the interposition of a connection element) to a wheel of the vehicle by means of a mechanical coupling element 5. For example, the mechanical coupling element 5 can be connected to a part of an articulated quadrilateral or to the hub of the wheel.

Advantageously, though not necessarily, the suspension comprises at least one main elastic element 11 (in particular, a helical spring) and a damping element (in particular, a hydraulic shock absorber 12, as shown in FIG. 1). In detail, the damping element comprises a stem 12', which is configured to move piston inside the damping element and to dissipate the forces transmitted by the vertical movement of the wheel on a road surface.

The device 2 is configured to be at least partially (in particular, totally) interposed between the frame of the vehicle (for example, of a known type and, hence, not shown herein) and the suspension 4(which, in turn, is consequently interposed between the device 2 and the respective wheel).

The device 2 is further configured to allow the vehicle to shift from a road configuration to a race configuration and vice versa. In other words, the device 2 is configured to lift or lower the rest position of the sprung masses of the vehicle (in particular, the height of the frame from the ground), so as to optimize track performances and allow the vehicle to normally drive on roads open to traffic (which usually have uneven surfaces).

Advantageously and according to the non-limiting embodiments of FIGS. 2 to 6, the device 2 comprises a base body 6, which comprises a first end 7, which can mechanically be connected to the frame of the road vehicle (through the mechanical coupling element 3).

Figure 2:
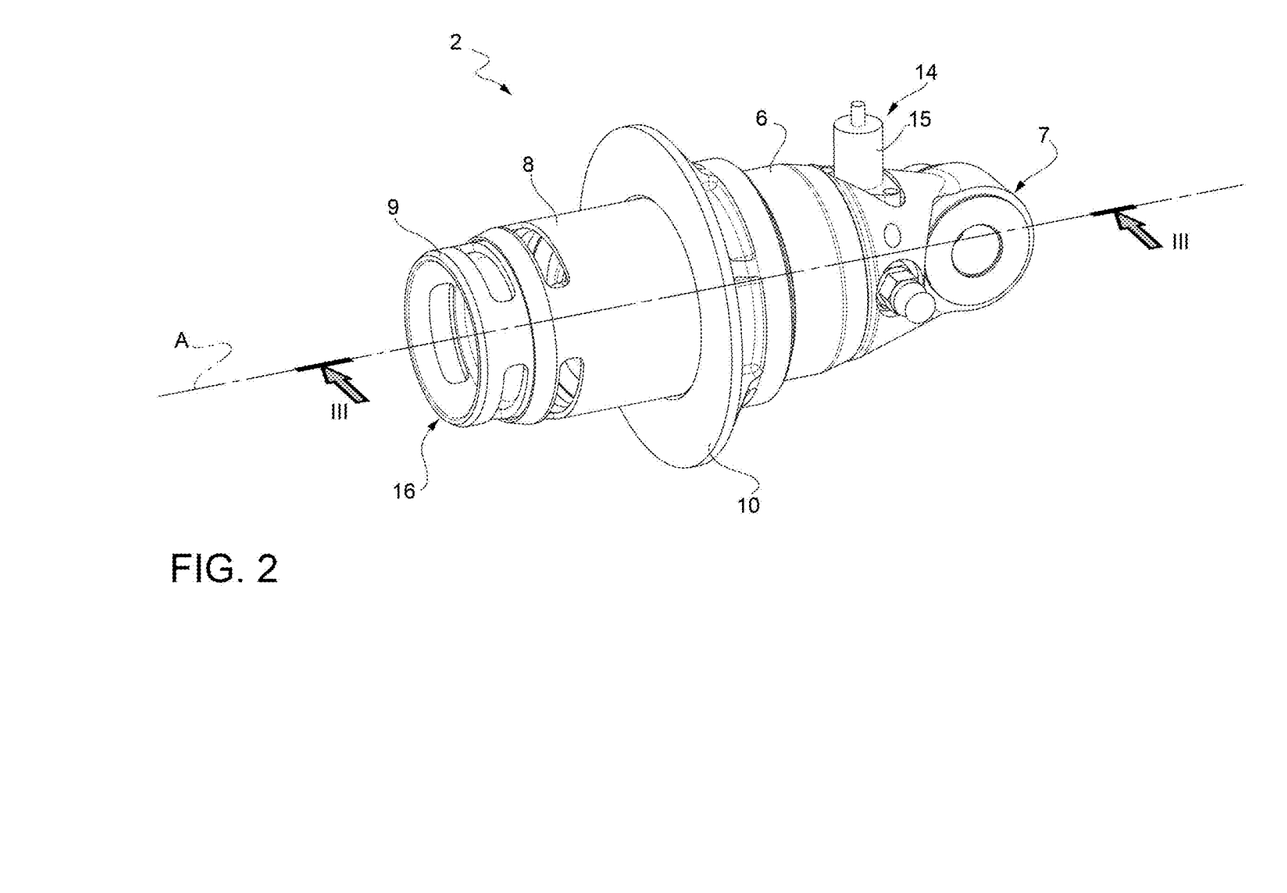
FIG. 2 is a schematic perspective view of a possible embodiment of a device according to the invention.

Furthermore, the device 2 comprises a movable mass 8, which is connected to the base body 6 so as to translate along a sliding axis A.

Figure 3:
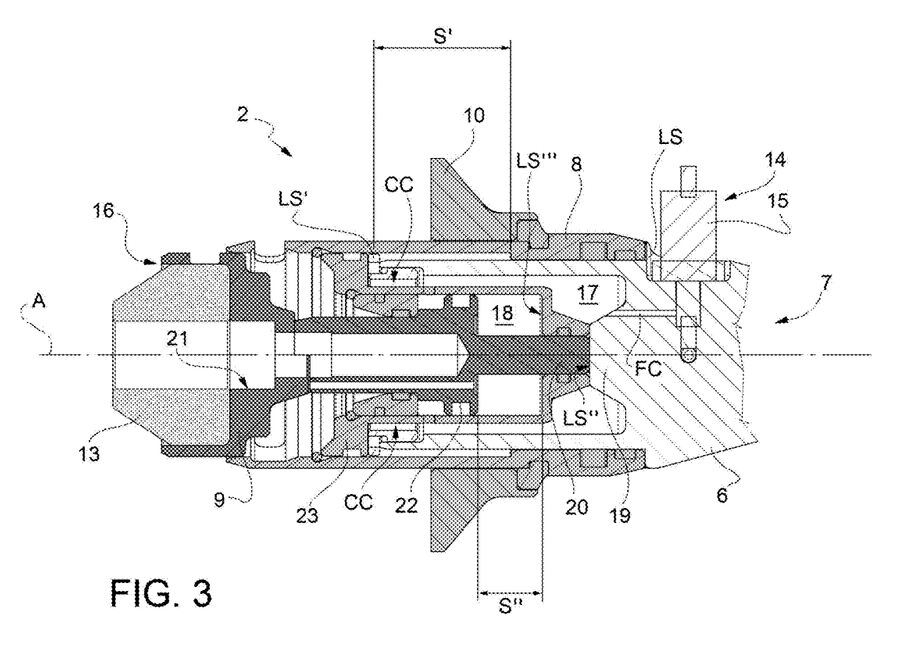
FIG. 3 is a schematic front section view of the device of FIG. 2 in a race configuration.
Figure 4:
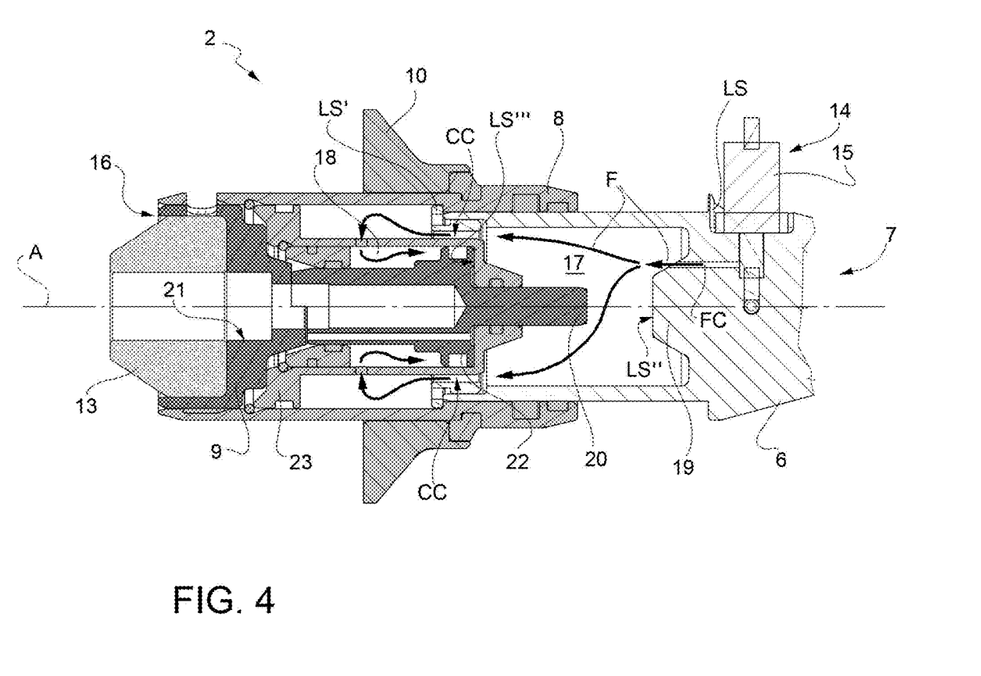
FIG. 4 is a schematic front section view of the device of FIG. 2 in a road configuration.

According to the non-limiting embodiments of FIGS. 3 and 4, which show a front section along plane III of FIG. 2, the movable mass 8 has a substantially cylindrical shape and is arranged on the outside of the base body 6, which is cylindrical as well.

Advantageously, the movable mass 8 is capable of assuming a first position (shown in FIG. 3) for the race configuration and a second position (shown in FIG. 4) for the road configuration.

In the non-limiting embodiments of the accompanying figures, the first movable mass 8 comprises a plate 10, which is configured to at least partially compress the main elastic element 11 of the suspension 4 and, hence, in particular, to adjust the height of the suspension 4 depending on its position. In other words, in the road configuration, the plate 10 is configured to be placed in a position that is farther form the frame (compared to the race configuration), thus lifting the sprung masses of the vehicle (namely, raising the bottom of the vehicle relative to the ground).

Advantageously, the device 2 also comprises a movable mass 9, which is connected to the movable mass 8 so as to translate along the sliding axis A as well. In other words, the movable mass 9 is at least partially constrained to the movable mass 8 and is configured to translate along the sliding axis A. Hence, the movable mass 9 is capable of assuming a third position (shown in FIG. 3) in the race configuration and a fourth position (shown in FIG. 4) in the road configuration. In particular, the movable mass 9 comprises an end 16, which is opposite the end 7 (see, for example, FIG. 2) and is configured to be able to be connected to the suspension 4 of the road vehicle (in particular, to the stem 12' of the shock absorber 12) and to change the stroke of the suspension 4 (namely, of the stem 12' of the shock absorber 12) depending on the position of the mass 9. In other words, by changing the position of the mass 9 along the sliding axis A, the stroke of the stem 12 of the suspension 4 can be changed.

In particular, in this way, the stroke of the suspension 4 can be handled independently of the position of the plate 10. For example, the stroke of the suspension can be set to length that is optimized for a correct operation thereof even in case of a road configuration. Indeed, in this way, the shock absorber 12 can be prevented from having a too long stroke and from damaging the bottom of the vehicle in the race configuration.

Advantageously, though not necessarily, the movable mass 8 is forced to slide along the sliding axis A between a limit stop element LS and a limit stop element LS', which are integral to the base body 6. In detail, the mass 8 is in contact with the limit stop element LS and with the limit stop element LS', respectively, in the first and in the second position, namely in the positions of FIGS. 3 and 4, respectively (and in the race and road configuration, respectively).

Advantageously, though not necessarily, the movable mass 9 is forced to slide along the sliding axis A between a limit stop element LS" and a limit stop element LS'". In particular, the element LS" is integral (belongs) to the base body 6 and the element LS'" is integral (belongs) to the movable mass 8 (as clearly shown in the accompanying figures by the different patterns used to indicate the base body 6, the mass 8 and the mass 9, with all components moving in an integral manner).

In particular, the movable mass 8 and the movable mass 9 are configured to move in an at least partially independent manner. More in particular, the movable mass 8 and the movable mass 9 are constrained to one another, but with a degree of freedom along the longitudinal axis A, namely the movable mass 8 and the movable mass 9 are coupled in a sliding manner so as to independently slide along the sliding axis A.

More precisely, the movable mass 9 is configured to move in an opposite direction relative to the movable mass 8.

According to a non-limiting embodiment, the movable mass 9 comprises a protuberance 20, opposite the second end 16, which is configured to adjust the distance between the third and the fourth position. In particular, the protuberance 20 lies on the longitudinal axis of the device 2 and is configured to strike against a contact element 19, thus determining the length of the stroke of the suspension 4 of the vehicle.

Advantageously, though not necessarily, the device 2 comprises at least one actuator system 14 (FIGS. 2-6), which is configured to move the movable mass 8 and/or the movable mass 9 from the road configuration to the race configuration and vice versa.

According to some non limiting embodiments, which are not shown herein, the actuator system 14 comprises mechanical moving means provided with threads in order to change the position of the mass 8 (and, hence, the length of the apparatus 1) and of the mass 9 (and, hence, the stroke of the suspension 4).

According to other preferred, though non-limiting embodiments, like the ones shown in FIGS. 2 to 6, the actuator system 14 is a hydraulic system comprising at least one monostable valve 15, which is configured to open or close a feeding channel FC and to allow a compression fluid F to flow through. In particular, the hydraulic system is automated and can be operated from the inside of a passenger compartment of the road vehicle while the road vehicle is standing still or is driving below a predetermined speed (lower than 10 km/h, more precisely lower than 5 km/h).

Figure 6:
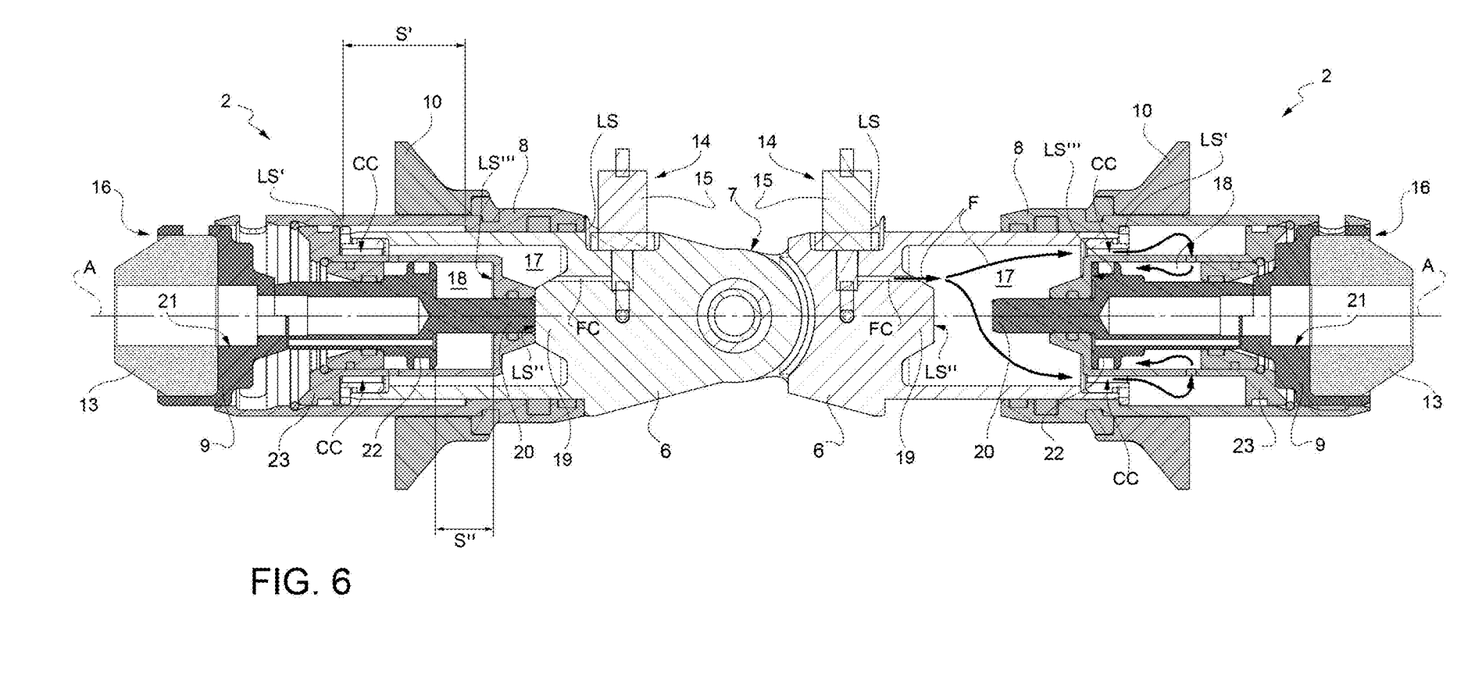
FIG. 6 is a front section view of the interconnected configuration of FIG. 5.

In the non-limiting embodiments of FIGS. 3, 4 and 6, the base body 6 delimits an adjustment camber 17, which is configured to be filled with or emptied from the compression fluid F. In particular, the movable mass 8 is configured, while shifting from the road configuration to the race configuration, to move away from the end 7 as the adjustment chamber 17 fills up. Obviously, the contrary happens while shifting from the road configuration, which is shown for example in FIG. 4, to the race configuration, which is shown in FIG. 3.

Advantageously, though not necessarily and according to the non-limiting embodiments of FIGS. 3, 4 and 6, the movable mass 9 delimits an adjustment chamber 18, which is configured to be filled with or emptied from the compression fluid F (depending on whether there is a shift from the road configuration to the race configuration or vice versa). In particular, the movable mass 9 is configured to move towards the end 7 as the adjustment chamber 18 fills up, thus increasing the stroke of the suspension 4. Obviously, the contrary happens while shifting from the road configuration, which is shown for example in FIG. 4, to the race configuration, which is shown in FIG. 3.

In the non limiting embodiment of FIGS. 3, 4 and 6, the movable mass 9 comprises a piston element 22 at least partially on the inside of the adjustment chamber 18 and the movable mass 8 comprises a piston element 23, which is at least partially located inside of the adjustment chamber 17.

Advantageously, though not necessarily, the hydraulic system 14 is configured (while shifting from the race configuration to the road configuration) to push, by means of the compression fluid (FIGS. 4 and 6), the piston 23 towards the end 16 (causing it to move away from the end 7). Furthermore, advantageously, though not necessarily, the compression fluid F, by flowing through one or more passage channels CC, is configured to push the piston 22 towards the end 7.

According to some preferred, though non-limiting embodiments, the compression fluid F is an oil.

In particular, the movable mass 8, together with the piston 23 and with the base body 6 (which acts as side wall), forms an outer cylinder, which is configured to adjust the rest length of the suspension 4 (in particular, of the spring-shock absorber assembly). By increasing the volume of fluid F on the inside of the chamber 17, the movable mass 8 moves from the end 7 (namely form the point in which it is coupled to the frame) towards the end 16 (namely, towards the wheel), thus increasing the length of the suspension and allowing the vehicle to be lifted from the ground.

In particular, the movable mass 9, together with the piston 22 and with the movable mass 8 (which acts as side wall), forms an inner cylinder, which adjusts the relative position of the buffer element (namely, of the limit stop buffer of the suspension 4).

According to some non-limiting embodiments, the movable mass 8 travels along a stroke S', which is the same as or greater than a stroke S" travelled by the second movable mass along the siding axis A. In particular, the stroke S' is greater than a fourth (preferably, a third) of the stroke S".

In the non-limiting embodiments of FIGS. 2 to 6, the movable mass 8 at least partially surrounds the base body 6 and the base body 6 at least partially surrounds the movable mass 9 and/or the movable mass 8 (in particular, the piston 23). This leads to a relatively small-sized structure of the device 2, which can easily be integrated in small spaces.

Advantageously, though not necessarily, the apparatus 1 further comprises a buffer element 13. In particular, the suspension 4 (namely, the shock absorber 12) is configured to travel a stroke defined based on the position of the buffer element 13, whose position depends, in turn, on the one of the movable mass 9. In particular, at the end of the stem 12 of the shock absorber there is connected the movable mass 9 (to which it is integral).

In particular, the position of the movable mass 9 at least partially depends on the position of the movable mass 8. In detail, the stem 12 is inserted in a substantially cylindrical housing 21 of the mass 9, which is arranged in the area of the end 16. More precisely, the stem 12 goes through the buffer element 13, which, in turn, is housed, so as to be integral to the movable mass 9, in the area of the end 16.

According to a further aspect of the invention, there is provided a road vehicle comprising a plurality of (at least two) apparatuses 1 as described above.

In particular, the road vehicle comprises two front driven wheels and two rear drive wheels.

Advantageously, though not necessarily, each one of the apparatuses 1 of the road vehicle is connected to the frame of the vehicle by means of a respective device 2 and to a respective wheel. In particular, each apparatus 1 comprises a buffer element 13, which is housed in the area of the end 16 and is configured to end the stroke of the respective shock absorber. As mentioned above, the buffer element 13 is integral to the movable mass 9.

According to some non-limiting embodiments, the road and race configurations of the vehicle are different from one another. In particular, the two apparatuses 1 (the devices 2) connected to the front wheels of the vehicle are different from the two apparatuses 1 (the devices 2) connected to the rear wheels of the vehicle. In this way, it is possible to adjust a differentiated lifting or lowering of the front part and of the rear part of the vehicle.

According to some non-limiting embodiments, each apparatus is housed in a wheel compartment of the vehicle.

In particular, each device 2 and the relative suspension 4 are in a substantially vertical configuration.

Figure 5:
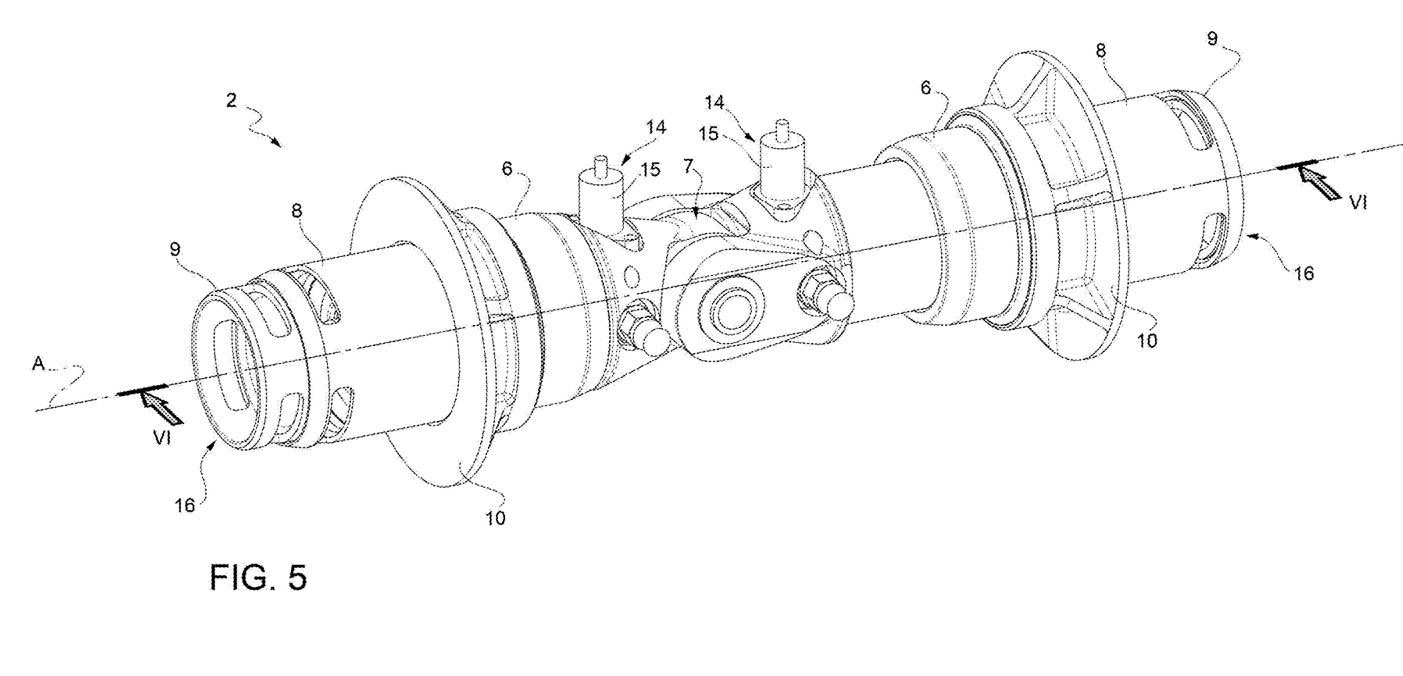
FIG. 5 is a schematic perspective view of a possible interconnected configuration of the two apparatuses of FIGS. 3 and 4, respectively, in a race configuration and in a road configuration.

According to other non-limiting embodiments, like the one shown in FIGS. 5 and 6, one or more apparatuses 1 are connected to a central area of the frame of the vehicle.

In particular, the area in which the apparatuses 1 are connected to the frame can be, in order to minimize the space taken up by the apparatuses 1, the same for apparatuses 1 arranged in a front part and/or in a rear part of the vehicle, respectively. More in particular, each device 2 and the relative suspension 4 are in a substantially horizontal configuration. As shown in the non-limiting embodiment of FIG. 5, the coupling elements 3 of the two apparatuses shown in said figure converge in the same coupling point, in particular determining an axis perpendicular to the axis A for a relative movement of the two apparatuses 1.

In order to make the explanation easier, the two apparatuses of FIGS. 5 and 6 are shown in the two different configurations; however, the two apparatuses are generally configured to be in the same configuration.

In use, according to FIGS. 3, 4 and 6, when the vehicle is caused (for example, by the driver by means of a suitable transducer) to shift from the race configuration to the road configuration (namely, from the position of FIG. 3 to the position of FIG. 4), the hydraulic system 14 (namely, the valve 15) injects the compression fluid F into the feeding channel FC towards the adjustment chamber 17. As the adjustment chamber 17 fills up, the piston 23 and, hence, the movable mass 8 are pushed by the fluid F so as to move away from the end 7, thus pressing against the elastic element 11 (the spring of the suspension 4) and lifting the bottom of the road vehicle.

In order to adjust the length of the suspension 4 in a suitable manner, without having it depend on the sole position of the plate 10, the compression fluid F flows from the chamber 17 to the chamber 18 and pushes the piston 22 up to the limit stop element LS''', in a direction that is contrary to the movement of the mass 9, towards the end 7.

Obviously, when shifting from the road configuration to the race configuration, the movements take place in a reverse manner. In particular, the hydraulic system stops injecting the fluid F under pressure and, therefore, due to the thrust of the elastic element 11 of the suspension 4, the fluid F flows in a direction contrary to the arrows shown in FIGS. 4 and 6, namely emptying the chambers 18 and 17 and flowing back to the hydraulic system 14 from the feeding channel FC. During the movement of the masses 8 and 9 towards the end 7, the first one that completes its movement is the mass 9, which strikes against the limit stop element LS'' through the pin 20. In particular, the device 2 is configured as a double concentric hydraulic cylinder.

In the non-limiting embodiments of FIGS. 3, 4 and 6, while shifting from the race configuration to the road configuration, the device 2 is configured to move, in a first segment, the sole mass 8, in a second segment, both masses 8 and 9 and, in a third segment, the sole mass 9 against the limit stop element LS'''. On the contrary, when shifting from the road configuration to the race configuration, in a first segment, the mass 8 and the mass 9 are moved by the thrust of the elastic element 11, thus emptying the chamber 17, in a second segment, the pin 20 comes into contact with the protuberance 19, thus stopping the mass 9, and, because of the continuation of the movement of the mass 8, the piston 22, in turn, empties the chamber 18 until the mass 8 reaches the limit stop element LS, hence concluding the transition.

Even though the invention described above relates to a specific embodiment, it should not be considered as limited to said embodiment, for its scope of protection also includes all those variants, changes or simplifications covered by the appended claims, such as for example a different type of actuator system, a different type of vehicle, a different geometric configuration, etc.

The device, the apparatus and the vehicle described above have many advantages.

First of all, the device 2 described above optimizes the shift between a road configuration and a race configuration for a high-performance vehicle, raising the bottom of the vehicle without jeopardizing the driving easiness and the safety thereof.

In particular, the device 2 allows the main elastic element (the spring) of a suspension to be moved (hence, moving the plate 10 away from the wheel) without increasing the stroke of the shock absorber too much (FIG. 3 clearly shows how the mass 9 projects out of the mass 8 so as to shorten the stroke of the shock absorber, moving the buffer element 13 closer in the direction of the wheel).

Furthermore, the device 2 described above allows both movable masses 8 and 9—namely, both concentric cylinders comprised in said device—to be moved by means of one single actuator system 14. Furthermore, the hydraulic actuation system allows manufacturers to use an oil already present on board the vehicle, without having to install a dedicated compression and injection system for the fluid.

In addition, a vehicle of the type described above can shift from the road configuration to the race configuration without the need to stop in a workshop or in a dedicated pit. In particular, the shift can also take place while the vehicle is moving, thus saving a lot of time.

More precisely, the shift can be activated by the driver to his/her liking, when approaching or leaving a race track, in complete autonomy.

A further advantage of the invention lies in the fact that the device 2 can easily be installed (making small changes) in already existing vehicles, for it can basically be installed, in terms of weight and dimensions, both in vehicles with vertical suspensions on the inside of the wheel compartment and in vehicles with more large-sized suspensions located horizontally.

Furthermore, the invention allows the stroke of the suspension to be differentiated and adjusted by solely varying the length of the pin 20. Therefore, the stroke of the suspension could be adjusted, in the two road and race configurations, by simply replacing the movable mass 9 with one having a pin 20 with a different length.

Finally, the device, the apparatus and the vehicle described above do not lead to a significant cost increase, since the installation of the device does not require either a new feeding system or special mechanical changes in order to allow for the replacement of a known hight adjustment device with one according to the invention.

LIST OF THE REFERENCE NUMBERS OF THE FIGURES 1 apparatus
2 device
3 coupling element
4 suspension
5 coupling element
6 base body
7 first end
8 first mass 9 second mass
10 plate
11 spring
12 shock absorber
12' stem
13 bugger element
14 hydraulic system
15 valve
16 second end
17 chamber
18 chamber
19 contact element
20 protuberance
21 stem housing
22 piston
23 piston
F compression fluid
LS limit stop element
LS' limit stop element
LS" limit stop element
LS'" limit stop element
CC passage channel
FC feeding channel
S' stroke
S" stroke
A sliding axis

The invention claimed is:

1. A device (2) for the height adjustment of a high-performance road vehicle; the device (2) being configured to be at least partially interposed between a frame and a suspension (4) of the road vehicle and to allow the vehicle to shift from a road configuration to a race configuration and vice versa; the device (2) comprising:

a base body (6) comprising a first end (7), which can mechanically be connected to the frame of the road vehicle;

a first movable mass (8), which is connected to the base body (6) so as to be movable along a sliding axis (A) and is capable of assuming at least a first position in the road configuration and a second position in the race configuration; wherein the first movable mass (8) comprises a plate (10), which is configured to at least partially compress a main elastic element of the suspension (4);

a second moveable mass (9), which is connected to the first movable mass (8) so as to be movable along the sliding axis (A) as well and is capable of assuming at least a third position in the road configuration and a fourth position in the race configuration;

wherein the second movable mass (9) comprises a second end (16), which is opposite the first end (7) and is connected to the suspension of the road vehicle (4) and to change the stroke of the suspension (4) depending on the position of the second movable mass (9); and wherein the second movable mass (9) is configured to at least partially move in an opposite direction relative to the first movable mass (8) and is forced to slide along the sliding axis (A) between a third limit stop element and a fourth limit stop element; wherein the third limit stop element is integral to the base body (6) and the fourth limit stop element is integral to the first movable mass (8), the second movable mass (9) is in contact with the third and the fourth limit stop element, respectively, in the third and in the fourth position.

2. A device (2) according to claim 1, wherein the first movable mass (8) is forced to slide along the sliding axis (A) between a first limit stop element and a second limit stop element, which are integral to the base body (6); the first movable mass (8) is in contact with the first and the second limit stop element, respectively, in the first and in the second position.

3. A device (2) according to claim 1, wherein the second movable mass (9) comprises a protuberance, opposite the second end (16), which is configured to adjust the distance between the third and the fourth position.

4. A device (2) according to claim 1 and comprising at least an actuator system, which is configured to move the first movable mass (8) and/or the second movable mass (9) from the road configuration to the race configuration.

5. A device (2) according to claim 4, wherein the actuator system is a hydraulic system (14) comprising at least a monostable valve (15), which is configured to open or close a feeding channel (FC) and allow a compression fluid (F) to flow through; in particular, the hydraulic system (14) is automated and can be operated from the inside of a passenger compartment of the road vehicle while the road vehicle is standing still or is driving below a predetermined speed; wherein the base body (6) delimits a first adjustment chamber (17), which is configured to be filled with or emptied from the compression fluid (F); the first movable mass (8) being configured to move away from the first end (7) as the first adjustment chamber (17) fills and to move the main (11) of the suspension (4).

6. A device (2) according to claim 5, wherein the first movable mass (8) delimits a second adjustment chamber (18), which is configured to be filled with or emptied from the compression fluid (F); the second movable mass (9) being configured to move close to the first end (7) as the second adjustment chamber (18) fills and to increase the stroke of the suspension (4).

7. A device (2) according to claim 5, wherein the first movable mass (8) comprises a first piston element, which is at least partially located inside the first adjustment chamber (17), and the second movable mass (9) comprises a second piston element, which is at least partially located inside the second adjustment chamber (18); the hydraulic system (14) is configured to push, through the compression fluid (F), the first piston element towards the second end (16) and, by causing the compression fluid (F) to flow through one or more passage channels, to push the second piston element toward the first end (7).

8. A device according to claim 1, wherein the first movable mass (8) and the second movable mass (9) are coupled in a sliding manner so as to independently slide along the sliding axis (A).

9. A device (2) according to claim 1, wherein the first movable mass (8) travels along a first stroke, which is the same as or greater than a second stroke travelled by the second movable mass (9) along the siding axis (A).

10. A device (2) according to claim 1, wherein the first movable mass (8) at least partially surrounds the base body (6), and wherein the base body (6) at least partially surrounds the second movable mass (9) and/or the first movable mass (8).

11. An apparatus (1) for the height adjustment of the road vehicle comprising the device (2) according to claim 1 and the suspension (4), which comprises at least the main elastic element and a shock absorber (12); wherein the shock absorber (12) is configured to travel a stroke, which is defined based on the position of a buffer element (13), whose position depends, in turn, on the one of the second movable mass (9); wherein the shock absorber (12) comprises a stem (12'), at whose end the second movable mass (9) is connected.

12. A vehicle comprising at least two apparatuses according to claim 11 and each connected to the frame of the vehicle by means of the device (2) and to a respective wheel; each apparatus (1) comprising a buffer element (13), which is housed in the area of the second end (16) and is configured to end the stroke of the respective shock absorber (12); the buffer element (13) being integral to the second movable mass (9).

13. A vehicle according to claim 12, wherein the road configuration and the race configuration are different between two apparatuses connected to front wheels and two apparatuses connected rear wheels of the road vehicle.

14. A vehicle according to claim 12, wherein each apparatus (1) is housed in a wheel compartment of the vehicle; in particular, each device (2) and the relative suspension (4) are in a substantially vertical configuration, wherein one or more apparatuses are connected to a central area of the frame; in particular, the connection area of the apparatuses is the same for apparatuses located in a front part and/or in a rear part of the vehicle, respectively; in particular, each device (2) and the relative suspension (4) are in a substantially horizontal configuration.

\* \* \* \* \*